April 14, 1970 — J. L. HARMS — 3,506,277

KEYLESS CHUCK ADAPTER

Filed March 3, 1967

INVENTOR,
JACK L. HARMS

BY Watson, Cole, Grindle & Watson
ATTORNEYS

United States Patent Office 3,506,277
Patented Apr. 14, 1970

3,506,277
KEYLESS CHUCK ADAPTER
Jack L. Harms, Leesburg, Ind., assignor to Zimmer Manufacturing Company, Warsaw, Ind., a corporation of Indiana
Filed Mar. 3, 1967, Ser. No. 620,530
Int. Cl. B23b 5/22
U.S. Cl. 279—1                                                       8 Claims

ABSTRACT OF THE DISCLOSURE

A device having an axially shiftable cylinder fixed for rotation with respect to the input shaft of an adjustable chuck and having locking teeth for engaging corresponding teeth on said chuck to provide keyless operation and positive anti-loosening action. The cylinder is spring biased into operative position and the locking teeth include axially extending faces on one side to positively prevent loosening during reverse rotation of the tool and sloping faces on the opposite side to allow rapid tightening by ratchet-like rotative action of the chuck.

---

Figure 1:
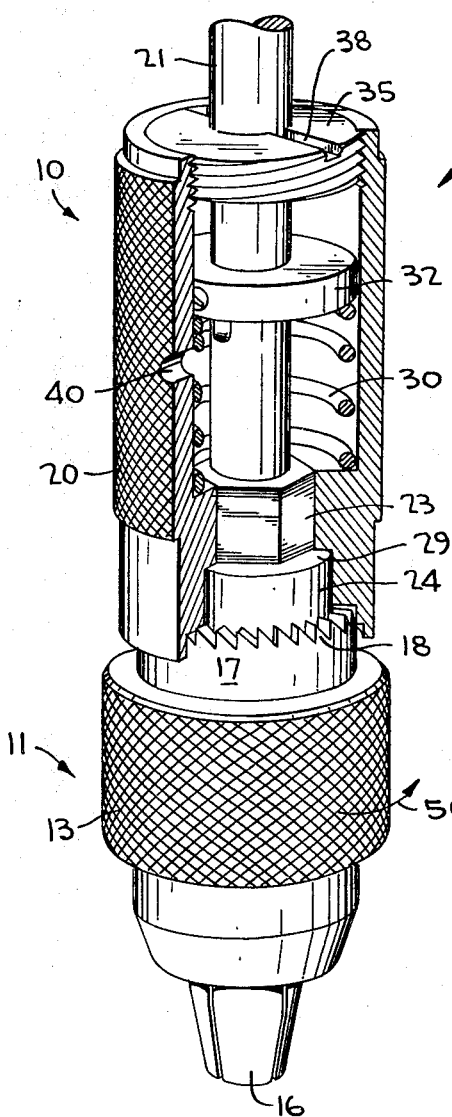

The present invention relates generally to tool holders for rotary driven power tools and, more particularly, to adapters for use with adjustable chucks.

In a number of drilling or related rotary power tool operations, it is desirable to rotate the drill bit or other tool in both the forward and reverse directions to obtain the desired quality of cut in the workpiece. For example, in such specialized power tool operations as surgical drilling and grinding, it is often necessary or desirable to be able to reverse the direction of the tool to smooth out or otherwise modify the cut made during the forward rotation of the tool. Furthermore, as has been found to be true in any general purpose chuck, it has been found to be particularly desirable in surgical applications to be able to reliably lock the tool in the chuck without the use of a key so as to allow quick and easy change of tools by the surgeon and to relieve the space on the surgical tray usually reserved for such a key for other important tools.

In the use of keyless chucks for tools that are so driven in both forward and reverse directions, it is of importance and indeed mandatory in surgical applications, to prevent the reverse rotation of the tool from loosening the chuck and thereby allowing inadvertent misalignment or complete removal of the tool from the gripping elements of the chuck. Prior to the present invention, several attempts have been made to provide operable keyless chucks; however, insofar as I am aware, these prior art devices have not resulted in complete satisfaction with regard to this anti-loosening feature. Specifically, these prior constructions rely only on frictional engagement of parts to prevent loosening and from experience it has been found that occasionally a tool will be loosened during an operation, which event could possibly have disastrous results in the case of human bone surgery. As a particular example, prior to the present invention the use of rapid forward and reverse oscillations of the power tool, which are sometimes employed by the neurosurgeon, for example, to give a desired type of finished opening during brain surgery, have been greatly hindered due to the need for constant checking of the chuck for tightness during the operation.

Thus, it is one object of the present invention to provide a keyless adapter for a chuck having means for positively locking the chuck to the drive shaft of the power tool whereby to prevent inadvertent loosening of the tool during operation in both forward and reverse directions.

It is another object of the present invention to provide such a device which is comparatively simple and rugged in construction for relatively low cost production and long life while at the same time being totally reliable in operation to prevent loosening of the tool.

For accomplishing these objectives, there is provided in accordance with the present invention an adapter for establishing direct driving relationship between the input drive shaft and both of the rotative elements of the chuck so that the same are driven together as a unit during rotation in either the forward or reverse direction to thereby prevent loosening of the chuck. In particular, in the preferred embodiment of the adapter illustrated for purposes of disclosing the invention, there is provided a locking cylinder which is mounted for axial movement along the input shaft between operative and release positions. A hexagonal section on the input shaft imparts a rotative driving relationship to the cylinder and locking teeth are provided on the end face of said cylinder for cooperation with mating teeth on the second rotative element of the chuck thereby positively locking said cylinder to the chuck. Preferably, the teeth are formed with one face extending in a plane passing through the axis of the composite tool holder to positively prevent relative rotation of the elements in the direction to effect loosening of the chuck; whereas, sloping faces are provided on the opposite side of the teeth so that tightening of the chuck may be easily effected by ratchet-like rotative action between the chuck and the locking cylinder, if desired.

Because of the foregoing structure, the device of the invention is easily operated by simply moving the locking cylinder to the release position with one hand while rotating the chuck in the desired direction with the other hand. When the tool has been properly positioned and tightened in the chuck, the locking cylinder is simply released to allow engagement of the teeth under the biasing force of a spring, thereby locking the chuck as described above.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

Figure 2:
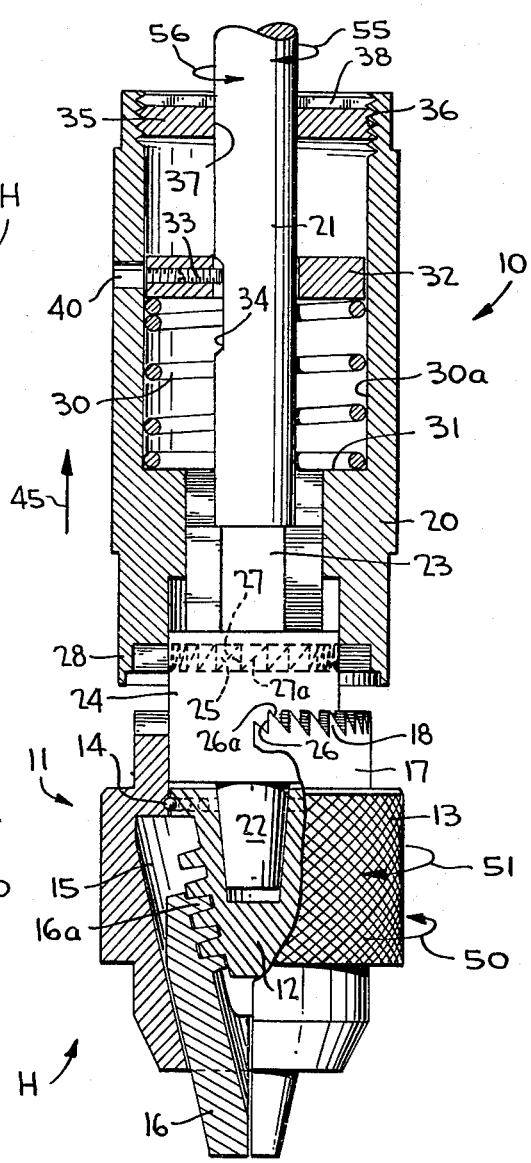

In the drawings:

FIGURE 1 is a perspective view of a tool holder unit constructed in accordance with the present invention with certain parts broken away for clarity; and FIGURE 2 is a full cross-sectional view of the adapter and a partial cross-sectional view of the chuck.

With specific reference now to the drawings, there is shown a tool holder, generally designated by the reference indicia H, including an adapter 10, constructed in accordance with the present invention, and operatively combined for use with a conventional chuck 11 for allowing keyless adjustment and positive locking of the same. As illustrated, the chuck 11 may comprise a tapered screw element 12 mounted for relative rotation with respect to a body element 13 by a series of suitable ball bearings 14. Formed in the interior of the body member 13 is a plurality of axially extending slideways 15 directed inwardly at a predetermined angle for accommodating gripping jaw elements 16, each of which has a driving rack 16a for operatively engaging the threads of the screw 12, as shown in FIGURE 2. Thus, upon relative rotation between the screw element 12 and the body element 13, the sliding jaw elements 16 are moved downwardly to grip the tool, such as a drill bit or grinding tool (not shown), in the conventional manner, or, conversely, said elements 16 are moved upwardly to release the tool. It should be pointed out that although the tool holder H is particularly useful in surgical applications, said holder H is obviously capable of operating with conventional drill bits or other rotary tools of general utility, if desired.

The upper portion of the body element 13 is formed with an upstanding collar 17 around the upper face of which is formed a plurality of teeth 18. These teeth 18 are for the purpose of cooperating with the adapter 10 so as to prevent relative rotation between the screw element 12 and the body element 13 during a drilling operation, as will be explained in detail later. It is noted that the provision of the collar 17 or its equivalent is the only modification necessary to allow the adapter 10 to be applied to the chuck 11.

The adapter 10 of the preferred embodiment illustrated includes a locking cylinder 20 which is mounted for axial movement along an input drive shaft 21. It will be clear that the upper end of the drive shaft 21 is to be connected in a suitable manner to a power source (not shown) for rotation of the unit. The lower end of the input shaft 21 terminates in a tapered nose portion 22 which is adapted to be securely received with a frictional fit in the screw element 12 so that a direct driving relationship is afforded between the input shaft 21 and the screw element 12.

The sliding relationship between the locking cylinder 20 and the input shaft 21 is established by cooperation of a hexagonal section 23 and an enlarged circular guide section 24 with corresponding mating interior sections of the cylinder 20, as can be seen from viewing the figures in the drawing. Of importance is the fact that the hexagonal section 23 prevents relative rotation between the input shaft 21 and the locking cylinder 20 so that a direct driving engagement is established therebetween.

The locking cylinder 20 is provided around its lower end periphery with a series of teeth 25 (note FIGURE 2) for engagement in mating relationship with the plurality of teeth 18 on the chuck 11. In the preferred embodiment illustrated, each of the teeth 18, 25 is formed in the shape of an equilateral triangle having one face 26, 27, respectively, extending in a plane passing through the axis of the shaft 21 with the other operative face 26a, 27a, respectively, being the hypotenuse of the equilateral triangle and sloping at substantially a 45° angle with respect to such plane. This arrangement prevents relative rotation between the locking cylinder 20 and the chuck 11 in one direction due to positively blocking engagement between the axially extending faces 26, 27, and allows ratchet-like rotation between the cylinder 20 and the chuck 11 when the force is applied in the opposite direction due to the sloping faces 26a, 27a. As will be seen later in detail, this cooperative action between the teeth 18 and the teeth 25 is thus to prevent loosening of the chuck 11 during reverse rotation of the shaft 21 while allowing tightening of the gripping jaws 16 by ratchet-like rotation of the chuck 11 in the opposite direction.

It should be noted at this point that in accordance with the broader aspects of the invention, the teeth 18, 25 could be formed with other shapes, if desired. For example, under certain circumstances the formation of said teeth 18, 25 as equilateral triangles may be appropriate to give the required positive anti-loosening effect in the reverse direction while allowing forced ratchet-like movement in both directions during tool insertion and removal.

Extending around the outer periphery of the teeth 25 on the lower face of the locking cylinder 20 is a downwardly depending skirt 28 which is mainly for the purpose of protecting the teeth 18, 25 from foreign matter. Also, the skirt 28 affords protection to the operator when he is grasping the locking cylinder 20 so as to prevent the catching and pinching of his hand or parts of his clothing between the teeth 18, 25 when the same are moved downwardly to the engaged position. A limit shoulder 29 on the input shaft 21 may be employed between the hexagonal driving section 23 and the enlarged guide section 24 and is for the purpose of limiting this downward movement of the cylinder 20 so as to relieve the teeth 18, 25 from undue strain when they are engaged, as shown in FIGURE 1.

For the purpose of so maintaining the teeth 25 of the locking cylinder 20 in operative engagement with the teeth 18 of the chuck 11, there is provided a compression spring 30 located within a chamber 30a of said cylinder 20; the lower end of the spring acting against an internal shoulder 31 and the upper end of the spring acting against a positioning disc 32. As will be clear from viewing FIGURE 2, the disc 32 is adjustably fixed to the input drive shaft 21 by a set screw 33 which acts against an elongated flat 34 formed on said shaft 21. The upper end of the chamber 30a is closed by a cover plate 35 so as to prevent foreign matter from entering said chamber 30a; the plate 35 being threadedly engaged with the interior of the cylinder 20 at 36. The center of the plate 35 is provided with an aperture 37 which slidably embraces the input shaft 21 and serves to provide an additional guide area for the relative movement between the parts. A slot 38 extends across the full width of the plate 35 for engagement by a suitable hand tool to allow removal of said plate 35 to gain access to the interior chamber 30a and to the adjustable positioning disc 32.

Assuming that the plate 35 is thus removed and that the set screw 33 has been loosened through use of a suitable hand tool through an access aperture 40 formed in the cylinder 20, the biasing force of the spring 30 is easily adjusted to suit the operator by moving the disc 32 in an axial direction along the input shaft 21 as desired, through the upper end of said cylinder 20. After the disc 32 has been so repositioned, the set screw 33 is again clamped against the flat 34 in the new position. After the adjustment has been made and the cover plate 35 is returned to its position, the maintenance of the desired biasing force in the spring 30 is insured.

In operation of the tool holder H to insert or remove a tool, assuming that the shaft 21 is held in a suitable vertical position, as shown, the locking cylinder 20 is grasped with one hand and held against rotation, and if desired simultaneously pushed upwardly along the shaft 21 to the release position, as indicated by arrow 45 in FIGURE 2. It will be realized that the body 13 is now easily rotatable in either direction with the other hand.

In the preferred embodiment shown, it will be clear that the gripping jaw elements 16 are moved downwardly to grip the tool when the body 13 is rotated in the counterclockwise direction, as indicated by the arrow 50 in FIGURE 1, and because of the fact that the faces 26a, 27a (note FIGURE 2) are formed at a 45° angle, the locking cylinder 20 may be left in the operative position shown in FIGURE 1 for this tightening operation whereupon the ratchet-like action described above will occur. However, it should be noted that in accordance with the broader aspects of the present invention, other shapes or forms of teeth 18, 25 could be used, as set forth above.

Once the tool has been firmly gripped by the jaw elements 16 by rotating the body 13 to its limit in the counterclockwise direction, the tool may be put in operation by initiating a forward rotation of the shaft 21, as indicated by the arrow 55 in FIGURE 2. There is, of course, no relative rotation between the elements 12, 13 in this mode of operation since the parts have been rotated to their limit to securely grip the tool in the jaw elements 16.

However, contrary to the prior art and in accordance with the objects of the invention, the input shaft 21 may also be rotated in the reverse direction as indicated by the rotational arrow 56 without causing a loosening of the chuck 11. This is possible since in this mode the rotating force is transmitted from said shaft 21 to the cylinder 20 through the hexagonal section 23 and thence through the axially extending faces 26, 27 of the teeth 18, 25 to the body element 13 of the chuck 11. Accordingly, no relative rotation between the screw element 12 and the body element 13 is possible and the tool being used can be operated in both forward and reverse directions without fear that the chuck 11 might become loose.

When the drilling or other operation has been completed and it is desired to remove the tool from the jaw elements 16, the locking cylinder 20 need only be grasped and pushed upwardly, as indicated by the arrow 45, thereby disengaging the teeth 18, 25 and allowing the chuck 11 to be rotated in a clockwise direction, as indicated by the arrow 51 in FIGURE 2. This, as stated, results in the gripping elements 16 being moved upwardly along the spiral threads of the screw 12 whereby the tool is released. Since the hexagonal portion 23 prevents rotation between the cylinder 20 and the input shaft 21 in the release position also, as shown in FIGURE 2, the screw 12 is held against rotation for obtaining the required relative rotation between said screw 12 and the body 13.

It should now be realized by those skilled in the art that the adapter 10 of the present invention positively prevents the loosening of the chuck 11 during operation, and the structure is of such nature that it can be readily applied to any conventional chuck with a minimum of modification. In addition, it is readily apparent that the design is such to allow keyless adjustment of the chuck 11 to grip and release the tool so as to greatly enhance the efficiency of the operation.

In this disclosure, there is shown and described only the preferred embodiment of the invention, but, as aforementioned, it is to be understood that the invention is capable of various changes or modifications within the scope of the inventive concept as expressed by the accompanying claims.

I claim:

1. An adapter for allowing keyless adjustment and positive locking of a chuck having axially extending gripping elements and first and second relative rotative elements rotatable in forward and reverse directions for gripping or releasing a tool, the adapter comprising an input drive shaft for connection to said first element of said chuck, a cylinder mounted for axial movement along said shaft between operative and release positions, means on said shaft establishing a direct driving engagement between said drive shaft and said cylinder, and means on said cylinder for positively locking said cylinder to said second element when in said operative position whereby said first and second elements may be driven together to thereby prevent loosening of said first and second elements during rotation of said shaft in said reverse direction.

2. The combination of claim 1 wherein said locking means includes at least one locking tooth formed on the end of said cylinder.

3. The combination of claim 2 wherein said locking means comprises a series of teeth formed in an annular array around said end of said cylinder.

4. The combination of claim 3 wherein is further provided a skirt depending from said end of said cylinder to protect said teeth from foreign matter.

5. The combination of claim 1 wherein is further provided a spring operatively mounted between said shaft and said cylinder so as to normally urge said cylinder to said operative position.

6. The combination of claim 5 wherein said spring is positioned within said cylinder and wherein is further provided a radially extending disc within said cylinder for fixing the end of said spring with respect to said shaft and means for adjusting the axial position of said disc to vary the biasing force of said spring.

7. The combination of claim 5 wherein is further provided a limit shoulder on said shaft for cooperative abutment with said cylinder in said operative position so as to relieve axial strain on said locking means.

8. The combination of claim 1 wherein said means on said shaft establishing driving engagement between said cyinder and said shaft comprises a multi-sided section, and wherein the inner wall of said cylinder is similarly shaped to cooperate with said multi-sided section.

References Cited

UNITED STATES PATENTS

| 1,410,080 | 3/1922 | Schwahlen | 279—69 |
| 2,628,105 | 2/1953 | McKean | 279—58 |
| 3,237,955 | 3/1966 | McCarthy et al. | 279—63 |

FOREIGN PATENTS

| 117,245 | 2/1901 | Germany. | |

ROBERT C. RIORDON, Primary Examiner

U.S. Cl. X.R.

279—63